United States Patent Office 3,411,919
Patented Nov. 19, 1968

3,411,919
CONTINUOUS-MIX BREAD CONTAINING NON-FAT MILK TOGETHER WITH BOTH CARRAGEENAN AND HYDROXYLATED PHOSPHATIDE IN SYNERGISTIC PROPORTIONS
Elmer F. Glabe, Chicago, Ill., and Earl C. Jertson, Trenton, N.J., assignors to Marine Colloids, Inc., Springfield, N.J., a corporation of Delaware
No Drawing. Filed Mar. 29, 1965, Ser. No. 443,653
10 Claims. (Cl. 99—91)

ABSTRACT OF THE DISCLOSURE

Continuous-mix bread containing nonfat milk in amounts from 2–6% by weight of the flour is prepared by incorporating with the bread mix prior to baking 0.10% to 1.0% by weight of hydroxylated phosphatide based on the weight of the flour, and 0.01% to 0.15% by weight of carrageenan extract based on the weight of the flour. The combined use of the two last mentioned ingredients makes it possible to use smaller amounts of each ingredient and at the same time obtain excellent loaf and loaf shape at both high and low levels of oxidizer.

---

This invention relates to food compositions, especially to bread making and more particularly to continuous bread making, usually referred to in the industry as "continuous-mix operations bread" and "batter-mix bread."

Up to the discovery of continuous bread making operations the conventional method of making bread consisted briefly of preparing a sponge dough of the flour, water, yeast, and yeast food. This was fermented for four to five hours during which time the yeast produced certain fermentation products which it has been found are quite responsible for a large part of the flavor of the resulting loaf of bread. The sponge dough is returned to the mixer, where it is mixed with additional flour and water, salt, sugar, lard, and nonfat dry milk. The latter ingredient has generally been used at the rate of approximately 4% to 6% based on the total weight of flour. It furnishes a substantial amount of taste to the loaf of bread. The flavor apparently blends very well with the products of fermentation to give a well rounded tasting loaf.

It has been known for many years that nonfat dry milk when used at levels over 5% in conventional bread produces certain untoward loaf effects. As the amount of nonfat milk is increased the loaf volume tends to diminish appreciably. These effects are noted at even lower levels if the milk has not been properly preheated during the drying operations. The theory is that the milk proteins themselves may actually be interfering substances in the dough structure which is built from flour proteins. Evidently the flour proteins found it difficult to support the foreign milk protein in attempting to build up to a sufficiently firm structure to permit holding proper volumes of gas to give a well rounded loaf of bread.

In the continuous-mix bread operations the sponge fermentation step is completely eliminated. A broth or "brew" is prepared in a tank. This consists of water, sugar, yeast, yeast nutrients, buffering agents and vitamin enrichment agents. A small amount of nonfat dry milk is included. This broth is fermented for 2½ hours at approximately 86° to 93° F. At the end of this period the broth is pumped to a blender or special incorporator where it is mildly mixed with flour, fat, and oxidizing agents in proper proportions. Mixing is on a continuous basis. This loosely mixed batter is then pumped directly to a special mixer where the dough is forced through a relatively narrow aperture within which an agitator is operating at high speed. The result of this operation is to thoroughly incorporate all the ingredients and more important to completely hydrate and develop the protein or gluten of the flour such that a dough structure is formed within 30 to 80 seconds. This step completely replaces the slow hydration of gluten or protein of the flour during the four to five hour fermentation step in conventional bread. The dough or batter is then immediately extruded directly into bread pans. These are transferred to a conventional proof box operating at approximately 100° F. and 95% relative humidity. After proofing or rising for about one hour, the pans are transferred to a standard baking oven and baked for about 25 minutes. Removal from the pan, cooling, slicing, and wrapping follow in order.

Continuous-mix bread has a very fine close grained, silky texture, but it is very low on flavor. The reason for this is two sources, the first being no long fermentation period wherein the flour and other ingredients are being acted upon by the yeast and the products of yeast fermentation. The second is the lack of nonfat dry milk. It has been found over several years of operations that continuous-mix bread will not stand high levels of nonfat dry milk. Whereas the conventional process bread contains an average of 4% to 6% continuous-mix bread now contains less than 1%. This has been the experience in the approximately 100 continuous-mix plants now in operation in the United States.

Any attempt to increase the nonfat dry milk level over 1% results in bread with exceedingly low volume and very weak side walls. When such bread containing 3% or 4% milk is put through the slicing and wrapping procedures, the result is loaves of bread which develop concave sides along with very low loaf volume and, therefore, slack-filled packages. Those bakers making use of the continuous-mix operations have reduced the nonfat milk level to 1% or lower with regret since this step naturally augments an already poor flavor situation. Since the continuous-mix operation is geared to short fermentation any method by which more milk can be used would obviously benefit the taste of the bread.

In U.S. Patent No. 3,121,013 a new and improved process for making continuous-mix bread is disclosed wherein 2% to 6% of nonfat dry milk based on the weight of the flour has been effectively incorporated into continuous-mix bread with a fraction of a percent of hydroxylated phosphatide, commonly known as hydroxylated lecithin.

According to the present invention, it has been found that a further improvement in the preparation of continuous-mix bread is obtained by incorporating a synergistic combination of hydroxylated phosphatide and carrageenan extract with a continuous bread making mix, preferably with 2% to 6% by weight nonfat dry milk, based on the weight of the flour, and baking a dough formed from said mix. The quantity of hydroxylated phosphatides should be within the range of 0.10% to 1.0%, preferably 0.25% to 0.50%, and the quantity of carrageenan extract should be within the range of 0.01% to 0.15%, preferably 0.0125% to 0.025%, based on the weight of the flour.

The synergistic activity of the hydroxylated phosphatide and the carrageenan extract is notable on bread made by the continuous or batter-mix process. Loaf volume, loaf shape and structural strength are improved even in the presence of average or higher quantities of nonfat dry milk, and at reduced levels of potassium bromate and iodate oxidizing agents. Potassium bromate and iodate are currently being used commercially in the continuous bread making process at close to maximum levels permissible by the bread standards in order to enhance dough and bread strength. It is believed that the use of such oxidizing agents, especially at the higher levels, may be responsible for lowered bread flavor. Thus, at levels in excess of 40 parts per million (p.p.m.) of potassium bromate and 10 parts per million (p.p.m.) of potassium iodate, based on flour weight, dough and bread strength are improved but flavor or taste is impaired. By the practice of this invention dough and bread stability are achieved with 20–40 parts per million of potassium bromate and 5–10 parts per million of potassium iodate, based on flour weight. Whereas, it has been desirable to use the maximum permissible amount of oxidizing agent ($KBrO_3$, $KIO_3$, $CaIO_3$, $Ca_2O_2$ or other oxidizing agent permitted by the bread standards) namely, 75 p.p.m., based on flour, this amount can now be reduced to one-third or two-thirds as much, with dough and bread stability and an improvement in taste.

Another advantage of the invention is that the synergistic combination affords the same development of the dough with slower mixing in the special mixer. For example, dough development ordinarily requires a high speed mixer operating at 200 revolutions per minute (r.p.m.) but with the addition of the synergistic combination in the amounts specified, the mixing speed can be reduced to 170–185 r.p.m.

The hydroxylated phosphatides are made by treating phosphatides under conditions that bring about hydroxylation of the phosphatide. Phosphatides have the general formula

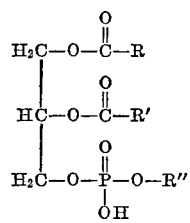

where R and R' are the hydrocarbon radicals of the higher fatty acids, some of which are unsaturated and R" is either a choline radical, a cholamine radical or a serine radical. The phosphate radical may occupy either the alpha or beta position. In the lecithins, R" is the choline radical, and in the cephalines R" is the cholamine radical.

It has been found that hydroxylation of such molecules at a double bond of the unsaturated fatty acids can be accomplished by treating the phosphatides with hydrogen peroxide, preferably in the presence of a water soluble aliphatic carboxylic acid, e.g., acetic, lactic, citric, tartaric, and the like, or with the peracids of such water soluble aliphatic carboxylic acids, e.g., peracetic, perlactic, and the like. Mineral acids such as sulfuric and phosphoric acids can also be used. As indicated, it is preferred to treat either with a mixture of hydrogen peroxide and edible acids or with the peracid of an edible acid since the reaction is more economical and a greater degree of hydroxylation can be obtained. However, hydrogen peroxide alone produces beneficial results. When acid conditions are employed, it is preferred not to use such an amount as will result in a pH value below 3 for a 1% aqueous solution of the mixture, since the phosphatides are easily decomposed under severe acid conditions. Greater amounts of acid may be used, however, where a greater degree of hydroxylation and water solubility are desired, although there is the danger of some decomposition taking place.

The resulting product has a decreased unsaturation as measured by the iodine value, indicating hydroxylation. The product has been hydrolyzed and acetyl values determined on the fatty acids recovered. These show a substantial increase in acetyl values over the acids recovered from the untreated phosphatides, and clearly indicate that hydroxylation occurs on the fatty acid portion. Dihydroxystearic acid has also been recovered from the hydrolysate of the treated material.

According to one method of procedure in preparing the hydroxylated phosphatides, the phosphatide is mixed with an acid, preferably an edible acid such as acetic acid, and warmed to a temperature above about 40° C., but below the temperature at which substantial decomposition of the phosphatide occurs. This latter temperature can readily be determined by routine experiment but in practice it is preferable not to heat the mixture above about 70° C. If crude soybean lecithin is used as the phosphatide it can be heated until it melts. The mixture of the phosphatide and acid is then mixed with hydrogen peroxide with agitation while maintaining a temperature below the decomposition temperature of the phosphatide. Thereafter it is desirable to neutralize the resultant product with an alkali, preferably sodium hydroxide. Finally, the product is dried under vacuum or in any other suitable manner. If the product is not neutralized at least a portion of the hydroxyl groups will be esterified by the acid used to accelerate and increase the extent of the hydroxylation. The preferred practice of the invention is to neutralize the product in order to remove any excess hydrogen peroxide and at the same time the neutralization hydrolyzes the ester groups to produce hydroxylated phosphatides in which hydroxyl groups are on adjacent carbon atoms of the fatty acid portion of the phosphatide. These products have proved to be especially valuable in the practice of the invention.

The preparation of hydroxylated phosphatides is described in several patents, including, for example, Wittcoff, U.S. Patent 2,445,948, and Julian et al., U. S. Patent 2,629,662. The use of hydroxylated phosphatides in the preparation of bakery products from fermented doughs is described in U.S. Patent 2,827,378.

The hydroxylated lecithin should preferably meet the following requirements:

| | | |
|---|---|---|
| (a) Acetone insoluble | percent | ≮60 |
| (b) Petroleum ether insoluble | percent | ≯1.0 |
| (c) Acid value | | ≯34.0 |
| (d) Iodine value | | ≯88.0 |
| (e) Acetyl value of the separated fatty acid fraction | | 33 to 38 |
| (f) Peroxide number | | ≯100 |
| (g) Moisture | percent | ≯2 |
| (h) pH 4.7–4.9 | | |

Carrageenan is the common and usual name of an extract obtained from seaweeds falling in the botanical class of Rhodophyceae that contains more than 20%, but not more than 40%, of ester sulfate groups on a dry weight basis. Typical species which are a source of carrageenan are *Chondrus crispus, Chondrus ocellatus, Eucheuma cottonii, Eucheuma spinosum, Gigartina acicularis, Gigartina pistillata, Gigartina radula and Gigartina stellata* and *Iridaea laminarioides*. The extract may be obtained by either hot or cold water extraction; it may or may not be modified through the addition of acids or alkalies during the extraction process; it is a sulfated polysaccharide, the dominant hexose units of which are galactose and anhydrogalactose; it may be composed of varying amounts of two or more fractions, the dominant fractions being kappa and lambda; the separate fractions also come within the scope and meaning of the definition of carrageenan; and the term applies to all salt forms such as sodium, potassium, calcium, ammonium, etc., or any combination of two or more of these cations.

In the practice of this invention lambda carrageenan has the advantage of being cold water soluble regardless of whether its dominant cation content is calcium, sodium or potassium. However, equally good results may also be obtained using cold water soluble kappa carrageenan, e.g., sodium kappa carrageenan. So-called "hot-water" soluble carrageenan products usually are in the form of calcium kappa carrageenan or blends of calcium kappa and calcium lambda carrageenan.

A preferred way of preparing the product for use in continuous bread making is to mix the hydroxylated lecithin with the nonfat milk, dry the resultant product and then dry-blend this product with the carrageenan extract. In this way, all of the nonfat milk which is to be used in preparing the continuous-mix bread can be contacted with the hydroxylated lecithin in the wet state before drying and thus all of the milk is brought into intimate contact with the hydroxylated lecithin and dried before it is brought into contact with the carrageenan extract. The resultant product can then be added in the manufacture of the continuous-mix bread.

To illustrate, in order to produce a continuous-mix bread containing 3% nonfat dry milk, the following additive (Composition A) would be prepared containing the nonfat dry milk, hydroxylated lecithin and carrageenan extract (e.g., *Eucheuma spinosum*).

COMPOSITION A

| Ingredients: | Percent by weight |
|---|---|
| Nonfat dry milk | 94.98 |
| Hydroxylated lecithin | 4.43 |
| Carrageenan extract | 0.59 |

In the preparation of continuous-mix bread containing 3% nonfat dry milk, 3.35% of Composition A would be used to provide all of the nonfat dry milk, the hydroxylated lecithin and the carrageenan extract.

In order to prepare bread containing 6% nonfat milk solids the following additive (Composition B) could be used:

COMPOSITION B

| Ingredients: | Percent by weight |
|---|---|
| Nonfat dry milk | 96.37 |
| Hydroxylated lecithin | 3.21 |
| Carrageenan extract | 0.42 |

In order to prepare a continuous-mix bread containing 6% nonfat milk solids, 6.5% of Composition B, based on the weight of the flour, would be added to the mix.

It is also possible to dry blend the carrageenan extract with a composition containing hydroxylated lecithin, hydrogenated vegetable and/or animal fat and nonfat dry milk. A typical composition of this type (Composition C) contains 97 parts by weight of a blend of 40% by weight hydroxylated lecithin, 10% by weight hydrogenated vegetable and/or animal fat, and 50% nonfat dry milk and 3 parts by weight carrageenan extract. In preparing this composition the hydroxylated lecithin and fat are first mixed together, the mixture is then introduced with agitation into liquid skim milk at approximately 70° F. to 120° F. and homogenized at around 2000 to 3000 pounds pressure. After the mixture comes from the homogenizer it is pumped to a standard spray dryer commonly used for making spray dried milk products and the composition is dried. The resultant rpoduct has a moisture content of approximately 1.5% and is a powder material resembling dehydrated whole milk powder. The carrageenan extract is then dry blended with this product to produce Composition C which is then employed as an additive in making continuous-mix bread. When the composition is prepared in this manner, most of the nonfat dry milk is added to the continuous mix separately and the quantity of Composition C employed would be around 0.25% to 0.75%, based on the weight of the flour.

The invention will be further illustrated but is not limited by the following example in which the quantities are stated in parts by weight unless otherwise indicated.

Example

A common white bread formula was used containing the usual basic ingredients as follows:

BREW

| | Grams |
|---|---|
| Water | 32,000 |
| Flour | 12,500 |
| Yeast | 1,500 |
| Yeast food | 250 |
| Sugar (cane) | 500 |
| Emulsifier | 50 |
| 2nd stage: | |
| Sugar (cane) | 500 |
| Salt | 1,000 |
| Calcium propionate | 50 |
| Sub total | 49,525 |

DOUGH

| | |
|---|---|
| Brew | 49,525 |
| Water | 2,500 |
| Sugar (cane) | 2,500 |
| Potassium bromate/iodate: | |
| Bromate | 2.5 |
| Iodate | .6 |
| Flour | 37,500 |
| Lard | 1,500 |

Nonfat dry milk when used at the levels specified was placed in the brew tank. Carrageenan and hydroxylated lecithin were added to the brew in dispersed forms. A southwestern winter wheat flour of 12.00% protein and 0.43% ash was used. All machine settings were held constant. Dough was scaled at 19 oz. Baking time was 16 minutes at 450° F.

Eight to sixteen loaves of bread were collected from each experiment. The bread was measured for volume and baked-weight. It was also scored for all characteristics according to the scoring system indicated in Table 1. For the purposes of this investigation, the number of bread characteristics used was reduced to total score, loaf volume and shape, texture-softness and resilience and bread taste. Texture softness and resilience ratios were measured by compressimeter. These values, as well as those for specific-loaf-volume, were transposed into score points. All score values are averages of eight to sixteen loaves each.

The results of pilot plant test runs made with carrageenan in bread without milk are shown in Table 2. This is a series of ascending levels of carrageenan from 0.0125% to 0.100% (based on flour weight). Experiments were made at the normal level of potassium bromate and iodate and in the complete absence of these oxidizers. Improvements in loaf shape are noted in the presence of 50 p.p.m. bromate-iodate combination. Loaf volume, however, is adversely affected showing a decline, then a rise at 0.025% carrageenan and a further drop at higher levels. Improvement in the texture softness/resilience ratios were notable in the loaves with no bromate and iodate. The taste scores also suggest that these oxidizers affect bread flavor for when they are reduced taste scores improve.

TABLE 1.—BREAD SCORE

| | Perfect-score value, points |
|---|---|
| Loaf volume (based on cubic centimeters per gram of bread of "Specific Volume") | 10 |
| Loaf shape | 5 |
| Crust color | 10 |
| Crust character | 5 |
| Grain | 10 |
| Crumb color | 10 |
| Texture | 15 |
| Odor | 10 |
| Mastication | 5 |
| Taste | 20 |
| Perfect total score | 100 |

TABLE 2.—BREAD WITH NO MILK—EFFECT OF CARRAGEENAN

| Experiment | Potassium Bromate/Iodate | Total Score | Loaf | | Texture Softness/Resilience | Taste |
|---|---|---|---|---|---|---|
| | | | Volume (cc./g.) | Shape | | |
| Control | 40 p.p.m./10 p.p.m | 84.00 | 6.64 | 3.00 | 13.25 | 18.00 |
| | None | 88.25 | 6.04 | 4.75 | 14.25 | 18.50 |
| 0.0125% Carrageenan | 40 p.p.m./10 p.p.m | 86.00 | 5.97 | 3.50 | 13.50 | 18.25 |
| | None | 90.00 | 5.65 | 4.75 | 14.25 | 18.75 |
| 0.0250% Carrageenan | 40 p.p.m./10 p.p.m | 89.75 | 6.40 | 4.50 | 13.50 | 18.50 |
| | None | 91.75 | 5.65 | 4.75 | 14.75 | 19.00 |
| 0.050% Carrageenan | 40 p.p.m./10 p.p.m | 88.00 | 5.70 | 4.75 | 13.50 | 18.50 |
| | None | 89.00 | 5.38 | 4.00 | 14.25 | 19.00 |
| 0.100% Carrageenan | 40 p.p.m./10 p.p.m | 87.75 | 5.50 | 4.75 | 13.50 | 18.50 |
| | None | 84.50 | 5.00 | 3.00 | 14.25 | 19.00 |

Table 3 shows the effect of carrageenan in bread containing milk. At the high oxidizer level improvement in loaf volume and shape are significant. Texture softness/resilience and taste are slightly improved. Total score, reflecting all bread-characteristic improvements, is significantly raised parallel to the level of carrageenan used. When the oxidizers are omitted bread taste, but no other characteristics, is improved.

TABLE 3.—BREAD WITH 4% MILK—EFFECT OF CARRAGEENAN

| Experiment | Potassium Bromate/Iodate | Total Score | Loaf | | Texture Softness/Resilience | Taste |
|---|---|---|---|---|---|---|
| | | | Volume (cc./g.) | Shape | | |
| Control | 40 p.p.m./10 p.p.m | 91.00 | 5.85 | 4.00 | 14.50 | 18.00 |
| | None | 83.75 | 5.36 | 2.50 | 13.00 | 19.25 |
| 0.0125% Carrageenan | 40 p.p.m./10 p.p.m | 94.25 | 5.93 | 4.25 | 14.50 | 19.25 |
| | None | 85.00 | 5.40 | 2.50 | 13.50 | 19.75 |
| 0.025% Carrageenan | 40 p.p.m./10 p.p.m | 95.75 | 6.10 | 4.75 | 14.75 | 19.25 |
| | None | 85.50 | 5.40 | 2.50 | 13.50 | 19.75 |

Turning to hydroxylated lecithin, the data on its effects on bread made with milk are given in Table 4. At the total potassium bromate and iodate levels of 50 p.p.m., hydroxylated lecithin at 0.25% and 0.50% increases loaf volume and improves loaf shape very appreciably. This is subsequently reflected in elevation of total score values. When all oxidizers are removed, the hydroxylated lecithin shows no power to change loaf volume, shape or texture. Bread flavor however, is improved, as in the carrageenan tests, when the oxidizers are omitted. Increasing the level of hydroxylated lecithin over 0.50% did not result in improvement over the results obtained with 0.50%, at least for the flour used in these tests.

Table 5 shows the combined effects of 0.01875% carrageenan and 0.20% hydroxylated lecithin. These levels of each material were selected from an evaluation of the data in the foregoing tables. The data in Table 5 suggest that carrageenan hydroxylated lecithin in combination are synergistic. Loaf volume, shape and to some extent, texture, are improved at the high levels of potassium bromate and iodate. Even more significantly, all of these characteristics, and flavor, are very appreciably improved when the oxidizer level is reduced by 50%.

TABLE 5.—BREAD WITH 3% MILK—COMBINED EFFECT OF CARRAGEENAN AND HYDROXYLATED LECITHIN

| Experiment | Potassium Bromate/Iodate | Total Score | Loaf | | Texture Softness/Resilience | Taste |
|---|---|---|---|---|---|---|
| | | | Volume (cc./g.) | Shape | | |
| Control | 40 p.p.m./10 p.p.m | 88.60 | 5.72 | 4.50 | 13.50 | 18.00 |
| | 20 p.p.m./5 p.p.m | 88.40 | 5.56 | 4.25 | 13.50 | 19.25 |
| 0.20% Hydroxylated Lecithin and 0.01875% Carrageenan. | 40 p.p.m./10 p.p.m | 91.00 | 6.03 | 4.75 | 13.85 | 18.25 |
| | 20 p.p.m./5 p.p.m | 92.10 | 5.80 | 4.75 | 14.25 | 19.25 |

Table 6 gives data on bread made with 6% milk both at 50 p.p.m. and 25 p.p.m. potassium bromate and iodate levels. The synergism of carrageenan and hydroxylated lecithin is again apparent in the increased loaf volume, improved loaf shape and texture-softness/resilience ratio along with the bread flavor elevation noted throughout these experiments when potassium bromate and iodate are reduced. The lower oxidizer level shows the best general characteristics suggesting that greater oxidizer levels are of doubtful usefulness in the presence of these two materials.

TABLE 4.—BREAD WITH 4% MILK—EFFECT OF HYDROXYLATED LECITHIN

| Experiment | Potassium Bromate/Iodate | Total Score | Loaf | | Texture Softness/Resilience | Taste |
|---|---|---|---|---|---|---|
| | | | Volume (cc./g.) | Shape | | |
| Control | 40 p.p.m./10 p.p.m | 91.00 | 5.85 | 4.00 | 14.50 | 18.00 |
| | None | 83.75 | 5.36 | 2.50 | 13.00 | 19.25 |
| 0.25% Hydroxylated Lecithin | 40 p.p.m./10 p.p.m | 93.25 | 6.10 | 4.50 | 14.75 | 18.25 |
| | None | 84.00 | 5.35 | 2.50 | 13.25 | 19.50 |
| 0.50% Hydroxylated Lecithin | 40 p.p.m./10 p.p.m | 94.75 | 6.17 | 4.75 | 14.75 | 18.25 |
| | None | 84.25 | 5.30 | 2.50 | 13.25 | 19.50 |

TABLE 6.—BREAD WITH 6% MILK—COMBINED EFFECT OF CARRAGEENAN AND HYDROXYLATED LECITHIN

| Experiment | Potassium Bromate/Iodate | Total Score | Loaf | | Texture Softness/Resilience | Taste |
|---|---|---|---|---|---|---|
| | | | Volume (cc./g.) | Shape | | |
| Control | 40 p.p.m./10 p.p.m | 88.13 | 5.98 | 4.00 | 13.50 | 18.75 |
| | 20 p.p.m./5 p.p.m | 90.13 | 5.69 | 4.50 | 14.25 | 19.25 |
| 0.20% Hydroxylated Lecithin and 0.01875% Carrageenan. | 40 p.p.m./10 p.p.m | 92.13 | 5.94 | 4.25 | 14.35 | 19.00 |
| | 20 p.p.m./5 p.p.m | 93.88 | 5.87 | 5.00 | 14.75 | 19.75 |

A general review of the data presented suggest that hydroxylated lecithin does produce greater dough stability and loaf volume by itself when higher levels of potassium bromate and iodate are present, and at lower levels of these two oxidizers when carrageenan is present.

Carrageenan shows little improvement on bread characteristics in the absence of milk. It does however, show significant effect on loaf volume, shape and texture, when milk is present. Combination of both materials has a complementary effect to the point that best bread characteristics are produced in the presence of milk and at substantially reduced levels of potassium bromate and iodate.

A plausible explanation for this apparent synergism is that dispersed hydroxylated lecithin promotes dough expansion through its effect on gluten. The carrageenan activity is one of protein cross-bonding. Combining the two effects produces the synergism of better loaf volume, shape, texture and flavor. These characteristics are obtainable in the presence of substantial quantities of milk and lowered levels of potassium bromate and iodate.

From the foregoing description it will be seen that the composition which is added to the continuous bread making mix may be prepared with or without shortening. In either case, it contains nonfat dry milk and the carrageenan extract is dry blended into the composition after the nonfat milk has been previously mixed with the hydroxylated phosphatide in the wet and dried. If the hydroxylated phosphatide is mixed with all of the nonfat milk which is to be added to the continuous bread making mix, the relative proportions of the ingredients in the composition are preferably within the range of 94% to 97% by weight nonfat dry milk, 3% to 6% hydroxylated phosphatide by weight, and 0.3% to 0.7% by weight carrageenan extract, to make a total of 100% by weight. If the hydroxylated phosphatide is first mixed with shortening and nonfat milk and dried, the proportions are preferably within the range of 10% to 50% by weight hydroxylated phosphatide, 5% to 15% by weight shortening, and 40% to 60% by weight nonfat dry milk, and about 97 parts by weight of this mixture is blended with about 3 parts by weight of carrageenan extract. It is highly desirable to add the carrageenan extract after the hydroxylated phosphatide has previously been blended with the nonfat milk because otherwise the carrageenan extract might form a complex with the milk and its effectiveness in complexing both the milk and the flour would be reduced.

The invention is hereby claimed as follows:

1. A method of making continuous-mix bread which comprises incorporating with a continuous bread making mix nonfat dry milk in amounts from 2% to 6% by weight of the flour in said mix, 0.10% to 1.0% by weight of hydroxylated phosphatide based on the weight of the flour, and 0.01% to 0.15% by weight of carrageenan extract based on the weight of the flour, and baking a dough formed from said mix.

2. A method of making continuous-mix bread which comprises incorporating with a continuous bread making mix nonfat dry milk in amounts from 2% to 6% by weight of the flour in said mix, 0.25% to 0.50% by weight of hydroxylated phosphatide based on the weight of the flour, and 0.0125% to 0.025% by weight of carrageenan extract based on the weight of the flour, and baking a dough formed from said mix.

3. A method of making continuous-mix bread which comprises incorporating with a continuous bread making mix a composition consisting essentially of hydroxylated phosphatide homogeneously dispersed with shortening and nonfat dry milk and dry blended with carrageenan extract, the proportion of said composition added to said mix being sufficient to give a total of 0.10% to 1.0% by weight of hydroxylated phosphatide based on the weight of the flour in said mix and 0.01% to 0.15% by weight of carrageenan extract based on the weight of the flour in said mix, adding sufficient additional nonfat dry milk to said mix to give a total of 2% to 6% by weight based on the weight of the flour of nonfat dry milk in said mix, including the nonfat dry milk in said composition, and baking a dough formed from said mix.

4. A method of making continuous-mix bread which comprises incorporating with a continuous bread making mix a composition consisting essentially of hydroxylated phosphatide homogeneously dispersed with shortening and nonfat dry milk and dry blended with carrageenan extract, the proportion of said composition added to said mix being sufficient to give a total of 0.25% to 0.50% by weight of hydroxylated phosphatide based on the weight of the flour in said mix and 0.0125% to 0.025% by weight of carrageenan extract based on the weight of the flour in said mix, adding sufficient additional nonfat dry milk to said mix to give a total of 2% to 6% by weight based on the weight of the flour of nonfat dry milk in said mix, including the nonfat dry milk in said composition, and baking a dough formed from said mix.

5. A method of making continuous-mix bread which comprises incorporating with a continuous bread making mix a composition consisting essentially of hydroxylated phosphatide homogeneously dispersed with nonfat dry milk and dry blended with carrageenan extract, the proportion of said composition added to said mix being sufficient to give a total of 0.10% to 1.0% by weight of hydroxylated phosphatide based on the weight of the flour in said mix, 0.01% to 0.15% by weight of carrageenan based on the weight of the flour in said mix, and 2% to 6% by weight of nonfat dry milk based on the weight of the flour in said mix, and baking a dough formed from said mix.

6. A method of making continuous-mix bread which comprises incorporating with a continuous bread making mix a composition consisting essentially of hydroxylated phosphatide homogeneously dispersed with nonfat dry milk and dry blended with carrageenan extract, the proportion of said composition added to said mix being sufficient to give a total of 0.25% to 0.50% by weight of hydroxylated phosphatide based on the weight of the flour in said mix, 0.0125% to 0.025% by weight of carrageenan based on the weight of the flour in said mix, and 2% to 6% by weight of nonfat dry milk based on the weight of the flour in said mix, and baking a dough formed from said mix.

7. A composition adapted for use in making continuous-mix bread containing nonfat milk solids, said composition consisting essentially of hydroxylated phosphatide homogeneously dispersed with nonfat dry milk and dry blended with carrageenan extract, the relative proportions of nonfat dry milk being within the range of 94 to 97 parts by weight nonfat dry milk, 3 to 6 parts by weight hydroxylated phosphatide and 0.3 to 0.7 part by weight carrageenan extract, the total being 100 parts by weight.

8. A composition adapted for making continuous-mix bread containing nonfat milk solids, said composition consisting essentially of hydroxylated phosphatide homogeneously dispersed with shortening and nonfat dry milk and dry blended with carrageenan extract, the carrageenan extract constituting about 3% by weight, and the hydroxylated phosphatide, the shortening and the nonfat dry milk constituting about 97% by weight of said composition, the proportion of hydroxylated phosphatide being 10% to 50% by weight, the proportion of shortening being 5% to 15% by weight, and the proportion of nonfat dry milk being 40% to 60% by weight of said 97% portion.

9. A process as claimed in claim 1 in which said continuous bread making mix contains 25 to 50 parts per million of oxidizing agent based on the weight of the flour.

10. A process as claimed in claim 2 in which said continuous bread making mix contains 25 to 50 parts per million, based on the weight of flour, of potassium bromate and potassium iodate.

References Cited

UNITED STATES PATENTS 3,121,013   2/1964   Glabe _____ 99—90
3,234,027   2/1966   Jertson et al. _____ 99—90

FOREIGN PATENTS 735,218   8/1955   Great Britain.

OTHER REFERENCES

Mack, "Brew Fermentation and Continuous Makeup," April, 1959, The Bakers Digest, p. 82 (99–90).

LIONEL M. SHAPIRO, *Primary Examiner.*

UNITED STATES PATENT OFFICE
CERTIFICATE OF CORRECTION

Patent No. 3,411,919

November 19, 1968

Elmer F. Glabe et al.

It is certified that error appears in the above identified patent and that said Letters Patent are hereby corrected as shown below:

Column 5, line 59, "rpoduct" should read -- product --. Column 8, TABLE 5, third column, line 4 thereof, "92.10" should read -- 93.10 --.

Signed and sealed this 21st day of April 1970.

(SEAL)
Attest:

Edward M. Fletcher, Jr.
Attesting Officer

WILLIAM E. SCHUYLER, JR.
Commissioner of Patents